(12) United States Patent
Moreno Colom et al.

(10) Patent No.: US 8,726,756 B2
(45) Date of Patent: May 20, 2014

(54) SHIFT BY WIRE GEARSHIFT DEVICE

(75) Inventors: Javier Moreno Colom, Barcelona (ES); Ferran Esquius I Rafat, Barcelona (ES); Jordi Jornet Vidal, Barcelona (ES)

(73) Assignee: Fico Triad, S. A., Barcelona (ES)

( * ) Notice: Subject to any disclaimer, the term of this patent is extended or adjusted under 35 U.S.C. 154(b) by 743 days.

(21) Appl. No.: 12/615,601

(22) Filed: Nov. 10, 2009

(65) Prior Publication Data

US 2010/0116075 A1    May 13, 2010

(30) Foreign Application Priority Data

Nov. 11, 2008    (EP) .................................. 08168858

(51) Int. Cl.
*F16H 59/02*    (2006.01)

(52) U.S. Cl.
USPC .................. 74/473.33; 74/473.28; 74/473.34; 74/471 XY (58) Field of Classification Search
USPC ................ 74/471 XY, 473.27, 473.28, 473.3, 74/473.33, 473.34
See application file for complete search history.

(56) References Cited

U.S. PATENT DOCUMENTS

| | | | |
|---|---|---|---|
| 2,732,447 A | 1/1956 | Findley et al. | |
| 4,183,424 A | 1/1980 | Rumyantsev et al. | |
| 4,930,366 A * | 6/1990 | Boucher et al. ................. | 74/365 |
| 5,315,900 A | 5/1994 | Teeter | |
| D366,439 S | 1/1996 | Allen, Jr. et al. | |
| 5,536,388 A | 7/1996 | Dinan et al. | |
| 5,957,001 A | 9/1999 | Gualtieri et al. | |
| 6,151,977 A | 11/2000 | Menig et al. | |
| 6,658,952 B2 * | 12/2003 | Hayashi et al. ............. | 74/336 R |
| 6,694,838 B2 | 2/2004 | Ersoy | |
| 6,705,180 B2 | 3/2004 | Arakawa et al. | |
| 6,904,827 B2 | 6/2005 | Arakawa et al. | |
| 6,930,594 B1 | 8/2005 | Wang | |
| 6,979,278 B2 | 12/2005 | Rick et al. | |
| 7,541,553 B2 | 6/2009 | Meyer et al. | |
| 2002/0139219 A1 | 10/2002 | Arakawa et al. | |
| 2003/0084741 A1 | 5/2003 | Ersoy | |
| 2004/0154424 A1 | 8/2004 | Arakawa et al. | |
| 2005/0090368 A1 | 4/2005 | Rick et al. | |
| 2006/0005660 A1 | 1/2006 | Rick et al. | |

FOREIGN PATENT DOCUMENTS

| | | |
|---|---|---|
| BR | 9801982 A | 10/1999 |
| CN | 1272168 | 11/2000 |
| CN | 1272168 A | 11/2000 |
| DE | 19821403 A1 | 11/1999 |

(Continued)

OTHER PUBLICATIONS

European Patent Search Report EP Application No. 08168858.2-1254 of Apr. 21, 2009.

*Primary Examiner* — William C Joyce
(74) *Attorney, Agent, or Firm* — Roberts Mlotkowski Safran & Cole, P.C.

(57) ABSTRACT

It comprises a fixed part (10) and a knob (20), said knob (20) being arranged such that it can be moved relative to said fixed part (10) for shifting operations, and a haptic device (30) for providing the user with a shifting feeling when operating the knob (20). The haptic device (30) may act between the knob (20) and the fixed part (10) and it may be mounted inside the knob (20). The haptic device (30) comprises a contoured surface fitted inside the knob (20) (31) and a follower finger (32) is arranged spring biased in the fixed part (10) towards the contoured surface (31).

10 Claims, 5 Drawing Sheets

(56) References Cited

FOREIGN PATENT DOCUMENTS

| | | |
|---|---|---|
| DE | 19919457 A1 | 11/2000 |
| DE | 10227991 A1 | 1/2004 |
| DE | 102005021678 | 7/2006 |
| EP | 0136267 | 4/1985 |
| EP | 0607655 A1 | 7/1994 |
| EP | 0629526 A1 | 12/1994 |
| EP | 0875698 A1 | 11/1998 |
| EP | 1248018 A2 | 10/2002 |
| EP | 1375972 A1 | 1/2004 |
| EP | 1752688 | 2/2007 |
| ES | 2100715 T3 | 6/1997 |
| FR | 2071184 A5 | 9/1971 |
| FR | 2707721 A1 | 1/1995 |
| JP | 06234334 A | 8/1994 |
| JP | H10207566 A | 8/1998 |
| JP | 10297298 A | 11/1998 |
| JP | 2001153214 A | 6/2001 |
| JP | 2002276804 A | 9/2002 |
| JP | 2002301949 A | 10/2002 |
| WO | 9426549 A1 | 11/1994 |
| WO | 9958881 A2 | 11/1999 |
| WO | 2006050703 | 5/2006 |
| WO | 2006074645 | 7/2006 |

* cited by examiner

SHIFT BY WIRE GEARSHIFT DEVICE

CROSS-REFERENCE TO RELATED APPLICATION

The present Application claims priority from European Patent Application No. EP 08168858.2 filed on Nov. 11, 2008 which is hereby incorporated by reference in its entirety into the present Application.

FIELD OF THE INVENTION

The present invention relates to a shift by wire gearshift device for vehicles that comprises a fixed part and a knob, according to the preamble of claim 1. In use, the knob can be moved manually relative to the fixed part for changing between different gearshift positions.

BACKGROUND ART

Shift by Wire (SbW) systems for gear shift control are known and have become increasingly common as they provide a number of advantages in terms of driving comfort and shifting quality. SbW systems typically comprise a gearshift device (shifting assembly), a knob (user interface) and a bezel (lever gap cover in a console which switches and other elements may be provided therein).

SbW systems with a gearshift device comprising a fixed part are also known. In such known devices, the knob may be provided with a number of switches, contact elements or other parts therein. The knob can be moved relative to the fixed part for performing shifting operations. They are performed upon relative movement of the knob by the user. Said relative movement of the knob to the fixed part causes at least one of the switches or contacts to be closed and a gear shift to be performed.

One example of such devices is disclosed in U.S. Pat. No. 4,183,424. The gearshift device disclosed in this document comprises a fixed part inside of which a current conduction element is placed, and a knob with a contact mounted therein. The knob is elastically mounted on the fixed part such that it can be moved relative thereto. When this occurs, that is, when in the process of gear change, contacts in the knob close.

U.S. Pat. No. 6,694,838 discloses a shifting device having a shift knob and a shifting mechanism mounted pivotably around at least one axis. A converting device is provided for converting the shifting movements into optical and/or electric and/or hydraulic signals and a transmitting device transmits signals.

A further example of this type of gearshift devices is that shown in U.S. Pat. No. 5,563,388. This device comprises a knob that is movable relative to a fixed part. Within the knob, at least one electrical contact is provided connected with the knob as well as an elastic centering element. A manual sideways movement of the knob relative to the fixed part in any direction displaces the contact element radially into one of several different contact positions in contact with the outside of the fixed part.

Although prior art gearshift devices having a movable knob for commanding shifting operations are simple in manufacture their use is not as efficient as it would be desirable as, in use, none of them efficiently provides the user with a shift feeling as if it is a mechanical shifting device.

SUMMARY OF THE INVENTION

The present invention provides a shift by wire gearshift device for vehicles according to claim 1 in which the user is provided with a shift feeling when acting on the knob for performing shifting operations.

Shift feeling in a device according to the invention is provided by including a haptic device that is suitable for giving the user (the driver in the following) said shift feeling when operating the knob in this type of gearshift devices.

In one embodiment, it is preferred that the above mentioned haptic device, in use, acts between the knob and the fixed part. It is to be noted that in the present invention the fixed part may correspond, for example, to the gearshift lever in typical gearshift devices provided that it is fixed, e.g. to the vehicle whether it is performed directly or though any other part fixed to the vehicle.

In a further embodiment of the invention, the haptic device, when in use, is mounted inside the knob.

According to a feature of the invention, the haptic device comprises a contoured surface or pad and a follower finger. The contoured surface or pad may be an appropriate uneven surface associated and movable with the knob. In use, the contoured surface may be fitted inside the knob and the follower finger may be arranged spring biased in the fixed part towards the contoured surface.

More particularly, the contoured surface of the haptic device is suitably designed for providing the driver with gearshift information for alerting that there is a change of speed when operating the knob. In other words, as the knob is moved by the driver relative to the fixed part, a feeling that there is a change of speed in use is perceived. This simulates efforts and feelings existing in a fully manual gearshift device or, for example, the P, R, N, D, M (Neutral Tiptronic), M+, M− . . . ) positions in a Triptronic system, and the like.

Coupling means are further provided for coupling the knob to the fixed part such that it can be moved relative to said fixed part.

In one embodiment, the coupling means may be a ball and socket joint comprising a ball which may be part of the fixed part that, in use, is housed within a recess formed in a lower portion of the knob. In other embodiments, there are provided an upper and a lower socket between which the ball is arranged.

In other embodiments, the coupling means may comprise a ball and socket joint in which the ball is part of the knob, or it may alternatively comprise mutually hinged cross pieces each linked to the fixed part and the knob, respectively.

The coupling means may include means for preventing the knob from being rotated around the longitudinal axis of the fixed part. In a first embodiment, the knob rotation preventing means may comprise a open ring such as a C-ring attached to or formed integral with the knob. The gap formed in the C-ring is suitable for receiving a protruding pin formed in the fixed part. The C-ring and the knob may be moved relative to the fixed part but preventing the knob to be rotated around the longitudinal axis of the fixed part. In a second embodiment, the knob rotation preventing means may comprise a rounded pin attached to the bracket that is inserted into a knob inner space such that the knob is prevented from being rotated around a said longitudinal axis of the fixed part. It is preferred that the width of the inner space is substantially the same as the size of the rounded pin.

The device of the invention may further comprise sensing means for detecting the position of the knob relative to the fixed part. Said sensing means may be fitted inside the knob and they may comprise at least one sensor selected from the group consisting of electromagnetic, inductive, Hall, and angular sensors.

Sensing means may comprise a three-dimensional sensor such as for example a single three-dimensional sensor capable of determining the angular position of a magnet, fitted inside the ball of the ball and socket joint of the coupling means, relative to the sensor itself. The sensor is therefore fixed to the fixed part and it may be located proximate the lower portion thereof. This allows the device to be constructively simplified.

The shift by wire gearshift device of the invention may further comprise smooth end stop means acting between the fixed part and the knob. The smooth end stop means may include a resilient O-ring fitted around the fixed part.

The provision of a haptic device in a shift by wire gearshift device of the movable knob type allows several advantages to be achieved: it is simple (no use is made of a crosspiece assembly for gear-shifting movement), moving masses are reduced, and a reduced number of parts involved in the shifter-knob-bezel assembly (the gearshift lever (i.e. the fixed part) in the device of the invention is not allowed to be moved to the gearshift console, there is no gaps to cover) is provided in conjunction with the provision of a gear shift feeling by the haptic device.

On the other hand, although the knob may be of a standard size such that it can be properly gripped by the user's hand, overall device size is further reduced as the haptic device is integrated in the knob. This results in that the vehicle interior designer has more flexibility as well as more freedom for fitting the gearshift device.

BRIEF DESCRIPTION OF THE DRAWINGS

A particular embodiment of a shift by wire gearshift device for vehicles according to the present invention will be described in the following, only by way of non-limiting examples, with reference to the appended drawings, in which.

Similar numerals used in the text denote similar elements.

DETAILED DESCRIPTION OF PARTICULAR EMBODIMENTS

In the figures several examples of the invention are depicted.

A shift by wire gearshift device according to the examples shown and disclosed herein comprises a fixed part 10 consisting of an elongated hollow rod. The fixed part 10 would correspond to the lever in typical gearshift devices and it has an upper hollow portion 34 and a lower hollow portion 36.

The device of the invention is fitted to a vehicle chassis or console (not shown for the sake of clarity) through a support member or bracket 60. The fixed part 10 is fixed to said bracket 60 by any suitable means known in the art.

Figure 6:
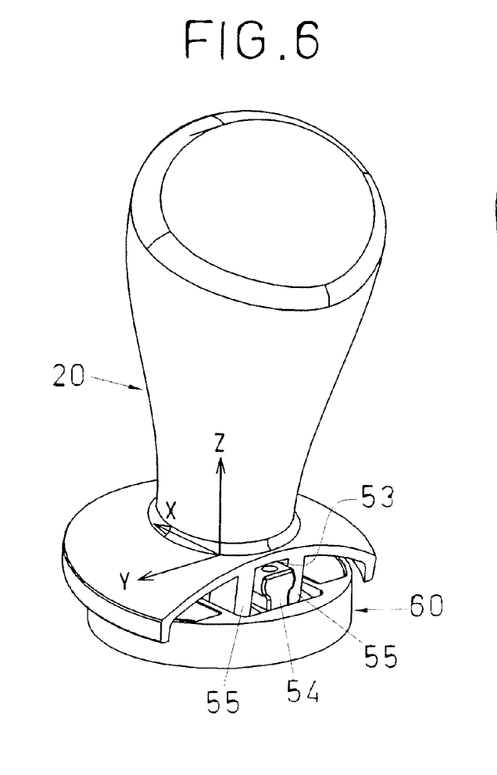
FIGS. 6 and 7 are perspective views of the embodiment of the shift by wire gearshift device in FIGS. 2 and 3 in which the lower portion thereof is partially broken away for showing how the second embodiment of the knob rotation preventing means operates with the knob in two different relative positions, respectively.
Figure 7:
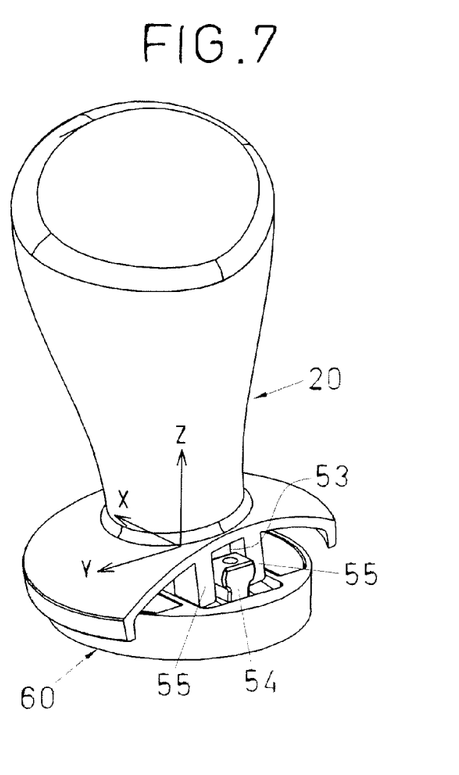

The shift by wire gearshift device shown further comprises a knob 20 provided with an upper cover 21. Knob 20 is arranged such that it can be moved relative to the fixed part 10 for shifting operations. More particularly, the knob 20 may be moved relative to the longitudinal axis 11 of the fixed part 10 from a neutral position (FIG. 1, 2 or 7) to a gearchange position by moving the knob 20 around axes X, Y. One example of such a gearchange position is that shown in FIG. 3 or FIG. 6 in which knob 20 has been rotated around an axis Y. The fixed part 10 thus serves the purpose of supporting the knob 20 such that it can be moved. However, and as it will be detailed below, the knob 20 is not allowed to be rotated around an axis that corresponds to or substantially matches the longitudinal axis 11 of the fixed part 10. This is carried out by the provision of knob rotation preventing means 50 that will be explained further below.

The shift by wire gearshift device of the invention is further provided with a haptic device 30 intended to provide the user (that is, the driver) with gearshift information. More particularly, the haptic device 30, in use, performs the function of giving the driver some feeling when operating the knob 20 for changing speed simulating efforts and feelings existing in a fully manual gearshift device, in a Triptronic device or the like.

For this purpose, the haptic device 30, which be described in detail below, is arranged for acting between the knob 20 and the fixed part 10 of the shift by wire gearshift device. In the embodiment shown in FIG. 1, for example, the haptic device 30 is mounted inside the knob 20.

As shown in the figures, the haptic device 30 comprises a contoured surface or feeling pad 31 and a follower finger 32. In the embodiments shown, the contoured surface or pad 31 is attached to and movable with the knob 20. The follower finger 32 of the haptic device 30 is fitted in an upper hollow portion 34 of the fixed part 10 and it is spring biased therein by a compression spring 33 that is also fitted in said upper hollow portion 34 of the fixed part 10, in alignment with the finger 32. The compression spring 33 keeps the finger 32 towards the contoured surface 31 such that its free end 35 is urged thereon. In use, the follower finger 32 slides onto the contoured surface 31 and, by traveling it through its irregularities when moving the knob 20, the different positions of the knob 20 are felt by the driver. In the embodiment shown in FIG. 1, for example, the contoured surface 31 is fitted inside the knob 20.

Feeling pattern provided by the haptic device 30 to the user when operating the knob 20 may be varied by changing the contoured surface 31. The contoured surface 31 may be formed integral with the above mentioned upper cover 21. Therefore, with the same device and with the same electronics the feeling pattern may be easily varied from vehicle to vehicle.

Coupling means are also provided for coupling the knob 20 such that it can be moved relative to the fixed part 10.

Figure 1:
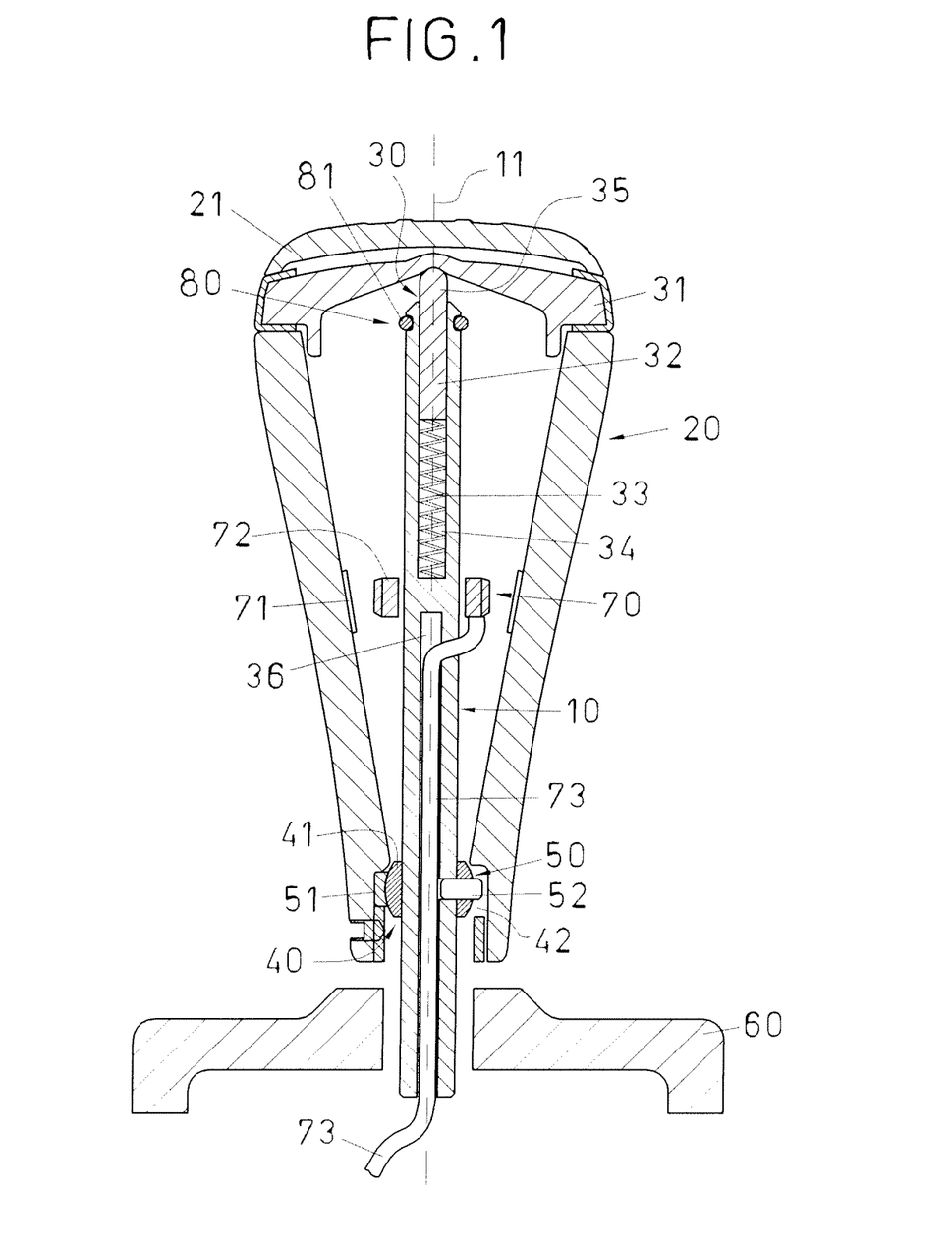
FIG. 1 is a cross-sectional view of one example of a shift by wire gearshift device according to the invention in which a first embodiment of the knob rotation preventing means is shown.

In a first embodiments, of the coupling means 40, as shown in FIG. 1, they comprise a ball and socket joint 41 such that ball is part of the fixed part 10 and it is housed within a recess 42 formed in the lower portion of the knob 20. Other means may be used for coupling the coupling the knob 20 such that it can be moved relative to the fixed part 10 such as, for example, mutually hinged cross pieces each linked to the fixed part 10 and the knob 20, respectively.

In a second embodiment of the coupling means 90, the ball is fixed to the knob 20 as it will be fully described below in connection with FIGS. 8-10 of the drawings.

As explained above, the coupling means 40 further include means 50 for preventing the knob 20 from being rotated around the longitudinal axis 11 of the fixed part 10.

Different embodiments of the knob rotation preventing means 50 are provided within the scope of the present invention.

In a first embodiment of the knob rotation preventing means 50, shown in FIG. 1, they comprise an open ring such as a C-ring 51 attached to or formed integral with the knob 20. The gap formed in the open portion of the C-ring 51 is suitable for receiving a protruding pin 52 that is formed in the fixed part 10. Accordingly, the C-ring 51 and thus the knob 20 may be moved relative to the fixed part 10, that is, they can be rotated around at least two axes X, Y that lie in a horizontal plane but not around an orthogonal axis Z corresponding or substantially matching the longitudinal axis 11 of the fixed part 10.

Figure 2:
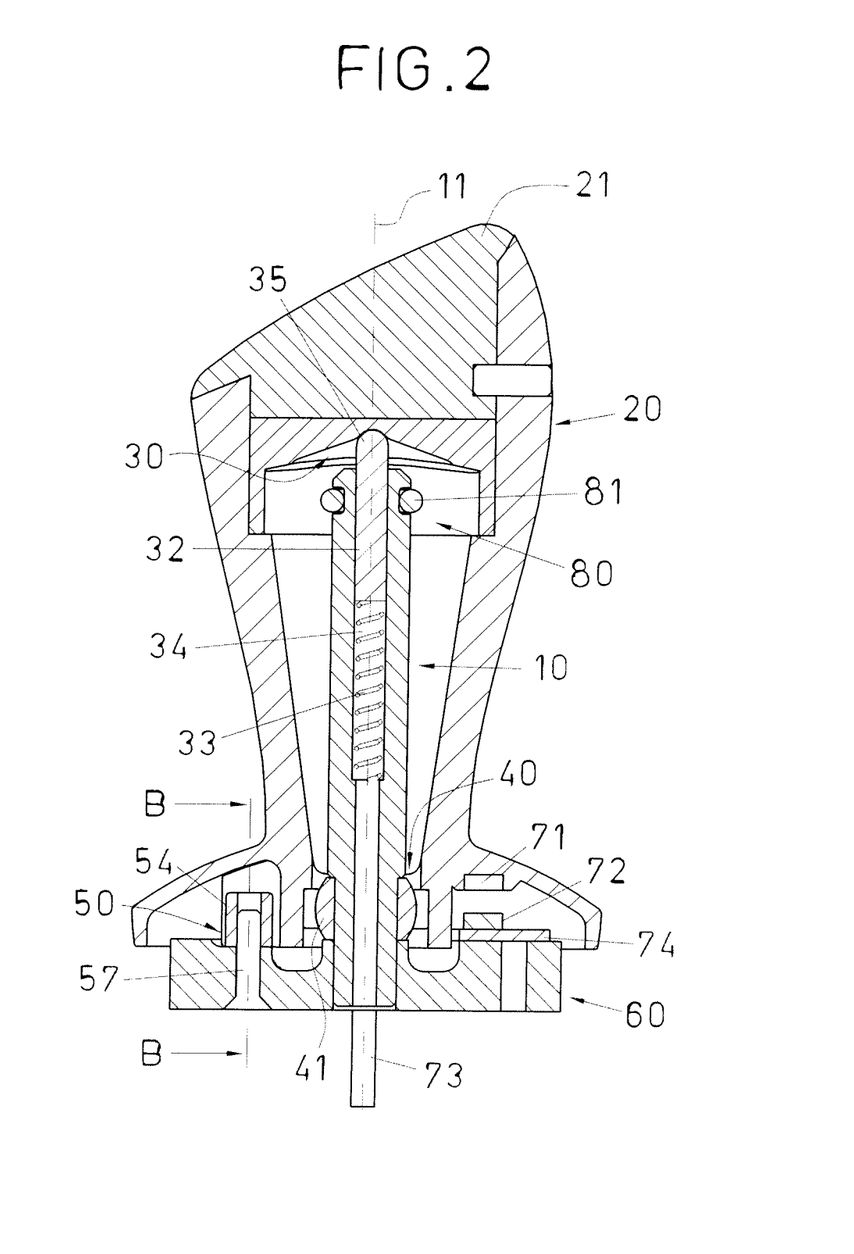
FIGS. 2 and 3 are cross-sectional views of a further example of a shift by wire gearshift device according to the invention showing the device with the knob in two different relative positions to the fixed part, respectively.
Figure 3:
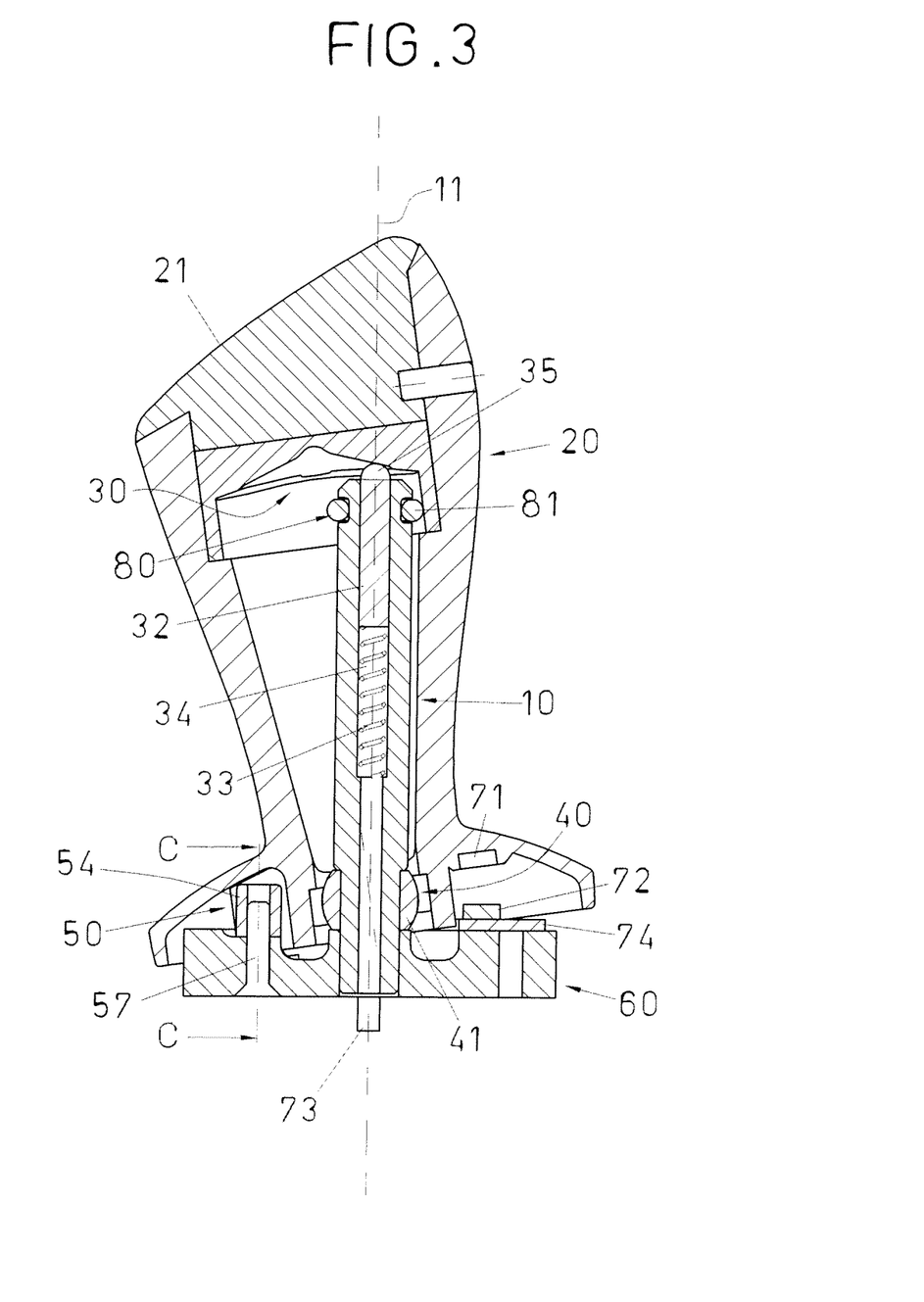
Figure 4:
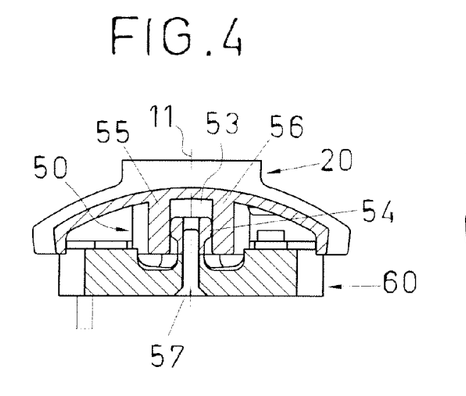
FIGS. 4 and 5 are broken away views of the embodiment of the shift by wire gearshift device in FIGS. 2 and 3 taken along lines B-B and C-C, respectively, in which a second embodiment of the knob rotation preventing means is shown in two different relative positions.
Figure 5:
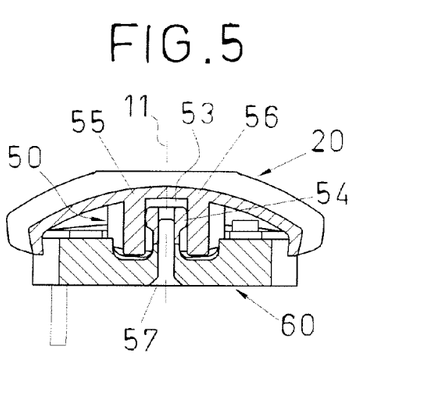

In a second embodiment of the knob rotation preventing means 50, shown in FIGS. 2-7 of the drawings, a rounded pin 54 is provided attached to the bracket 60 by means of, for example, a bolt 57 as shown in FIGS. 4 and 5. In use, the rounded pin 54 is inserted into a knob inner space 53. As shown in FIGS. 4-7 of the drawings, the knob inner space 53 is defined by two parallel walls defining arms 55, 56 that form an U-shaped portion between which the rounded pin 54 is fitted. With this arrangement, the knob 20 is prevented from being rotated around a vertical axis Z (see FIGS. 6-7) corresponding to or substantially matching the longitudinal axis 11 of the fixed part 10. As best shown in FIGS. 4-5, the width of the inner space 53, that is, the spacing between arms 55, 56, is substantially the same as the size of the pin 54.

Figure 11:
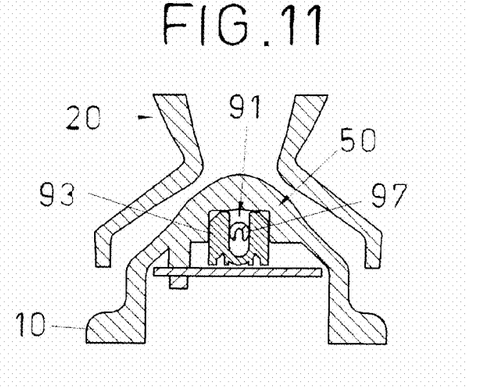
FIG. 11 is a fragmentary cross sectional view a further embodiment of a shift by wire gearshift device according to the invention.

In a third embodiment of the knob rotation preventing means 50 shown in detail in FIG. 11 of the drawings, they comprise a pair of cylindrical pins 97 extending in opposite directions from the ball 91. Pins 97 are allowed to rotate within the U-shaped lower socket 93. Lower socket 93 is fixed by screws to the fixed part 10 and the ball 91 is fixed to the knob 20, as shown in FIG. 11.

The shift by wire gearshift device of the invention is further provided with sensing means 70 for detecting the position of the knob 20 relative to the fixed part 10. The sensing means 70 comprise one or more magnets 71 (or a metal plate) and sensor elements 72 that may comprise at least one sensor such as, for example, electromagnetic sensor, inductive sensors, Hall sensors, angular sensors, etc. and electricity conductor means in the form of a cable 73 running within the lower hollow portion 36 of the fixed part 10. Therefore, in use, the position of the magnets 71 relative to the sensors 72 (see FIGS. 1-3) are detected for the different operating positions of the knob 20.

The sensor may be provided in the bracket and the magnets (or metal plates) in the knob.

In the embodiment of the device in FIG. 1, the sensing means 70 are fitted inside the knob 20. In this case, the magnets 71 are arranged attached to the internal surface of the knob 20. However, the sensing means 70 may be fitted between the bracket 60 and the knob 20 as shown in the embodiment of the device in FIGS. 2 and 3. In this case, an electric circuit 74 is fitted on the bracket 60 cooperating with sensor elements 72 and magnet 71.

Smooth end stop means 80 are also provided. In the embodiments of the invention shown in the drawings, said stop means 80 comprise a resilient O-ring 81 fitted around the fixed part 10, at the upper portion thereof, near the haptic device 30, as shown in FIGS. 1-3. Other constructions and locations of the smooth end stop means 80 may be of course used provided that, in use, the location of the O-ring 81 is such that it acts between the fixed part 10 and the knob 20 in the knob limit travel as shown in FIG. 3.

Figure 8:
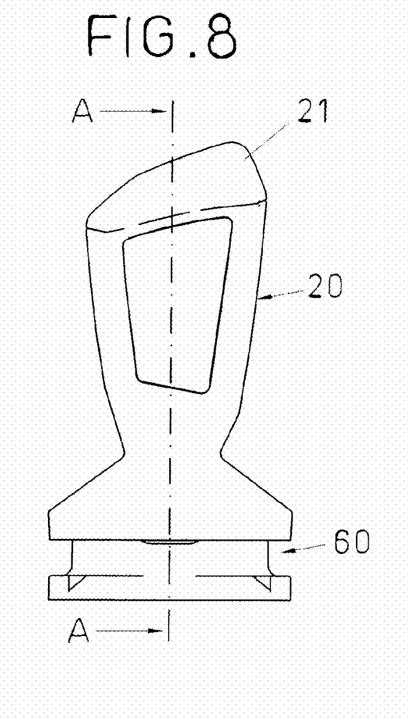
FIG. 8 is a elevational view of a further embodiment of a shift by wire gearshift device according to the invention.
Figure 9:
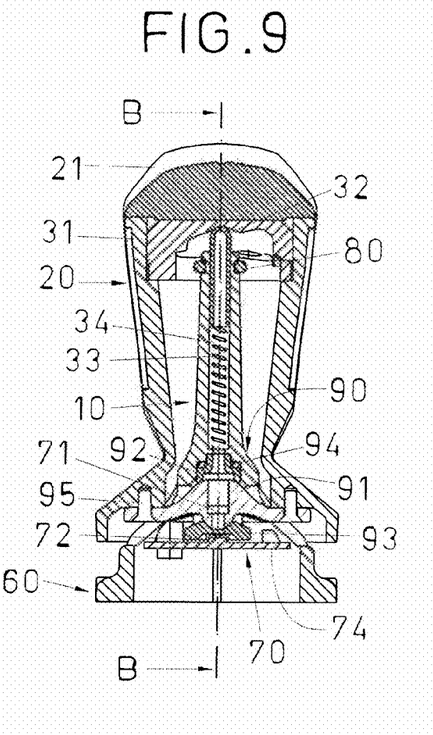
FIG. 9 is a cross sectional view of the embodiment of the shift by wire gearshift device taken along line A-A in FIG. 8.
Figure 10:
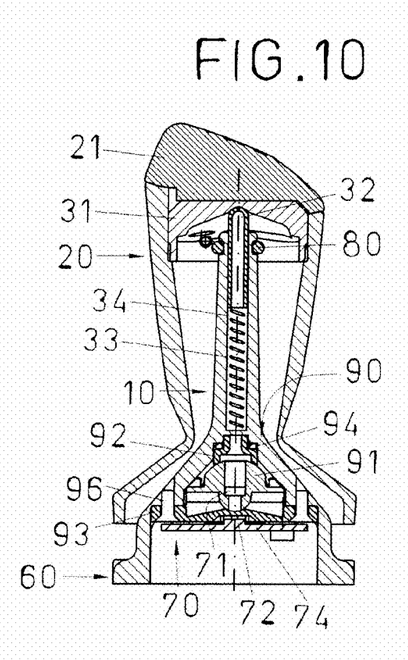
FIG. 10 is a cross sectional view of the embodiment of a shift by wire gearshift device taken along line B-B in FIG. 9.

Now referring to FIGS. 8-10 of the drawings, the coupling means 90 comprise a ball and socket joint comprising a ball 91 that is fixed to the knob 20 and that, in use, is housed within a recess formed between an upper socket 92 and a lower socket 93. The upper socket 92 is housed in the fixed part 10 and the lower socket 93 is fixed to the fixed part 10 through screws 95.

In this embodiment, the position of the knob 20 relative to the fixed part 10 is detected in a lower portion of the knob 20. More particularly, magnetic signal emitting members (i.e, magnets 71 fitted inside the ball 91) are provided as well as an electric circuit 74 for sensing said signal. Such electric circuit 74 is arranged in the fixed part 10, so both the circuit 74 and the magnets 71 of the sensing means 70 are arranged in the lower portion of the knob 20 as shown in FIGS. 9-10.

Between the upper socket 92 and the lower portion of the fixed part 10 an O-ring 94 is provided intended for reducing free plays. For construction purposes, the ball 91 has two radii, each corresponding to sockets 92, 93 respectively. The ball 91 is fixed to the knob through screws 96.

In this embodiment, the knob rotation preventing means 50 comprises two protruding pins formed in the ball 91 and U-shaped portions formed in the lower socket 93.

In this or in any embodiment, the sensing means 70 may comprise a three-dimensional sensor such as for example a single three-dimensional sensor capable of determining the angular position of a magnet 71 relative to the sensor itself.

The invention claimed is:

1. A shift by wire gearshift device, which comprises:
   a fixed part,
   a knob, said knob being arranged such that the knob can be moved relative to said fixed part for shifting operations,
   a haptic device mounted inside the knob, said haptic device configured to provide a user with a shifting feeling when operating the knob,
   a coupling means for coupling the knob such that the knob can be moved relative to the fixed part,
   the coupling means including a knob rotation preventing means that prevents the knob from being rotated around an axis that corresponds to or substantially matches the longitudinal axis of the fixed part,
   said knob rotation preventing means comprising a knob inner space into which a rounded pin is inserted such that the knob is prevented from being rotated around the longitudinal axis of the fixed part,
   a sensor disposed along a central portion of the fixed part,
   at least one magnet disposed along an inner peripheral surface of the knob corresponding to the location of the sensor for sensing a position of the knob, and
   an end stop means acting between the fixed part and the knob, wherein said end stop means comprises a resilient O-ring fitted around the fixed part.

2. The shift by wire gearshift device as claimed in claim 1, wherein the haptic device comprises a contoured surface and a follower finger.

3. The shift by wire gearshift device as claimed in claim 2, wherein the contoured surface is fitted inside the knob and the follower finger is arranged spring biased in the fixed part towards the contoured surface.

4. The shift by wire gearshift device as claimed in claim 1, wherein the coupling means is a ball and socket joint.

5. The shift by wire gearshift device as claimed in claim 1, wherein the coupling means comprises mutually hinged cross pieces each linked to the fixed part and the knob, respectively.

6. The shift by wire gearshift device as claimed in claim 1, wherein a width of said knob inner space is substantially the same as a size of the rounded pin.

7. The shift by wire gearshift device as claimed in claim 1, wherein a sensing means is fitted in a lower portion of the fixed part.

8. The shift by wire gearshift device as claimed in claim 1, wherein said at least one sensor is selected from the group consisting of electromagnetic, inductive, Hall, and angular sensors or a combination thereof.

9. The shift by wire gearshift device as claimed in claim 1, wherein the fixed part is fixed to a vehicle.

10. The shift by wire gearshift device as claimed in claim 1, wherein:
- the haptic device is mounted inside the knob and acts between the knob and the fixed part, and
- the gearshift device further comprises an electromagnetic three-dimensional sensing means fitted inside the knob for detecting a position of the knob relative to the fixed part.

\* \* \* \* \*